Sept. 9, 1969     M. D. TUPPER     3,465,795
EASILY DRESSED SHARPENER
Filed Nov. 9, 1966
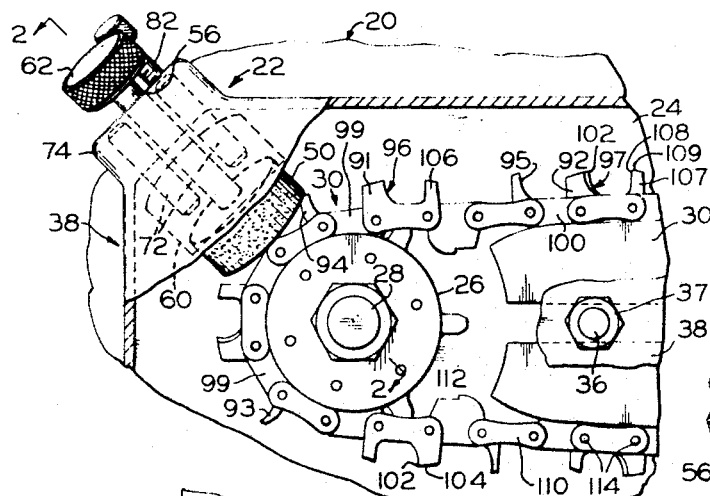
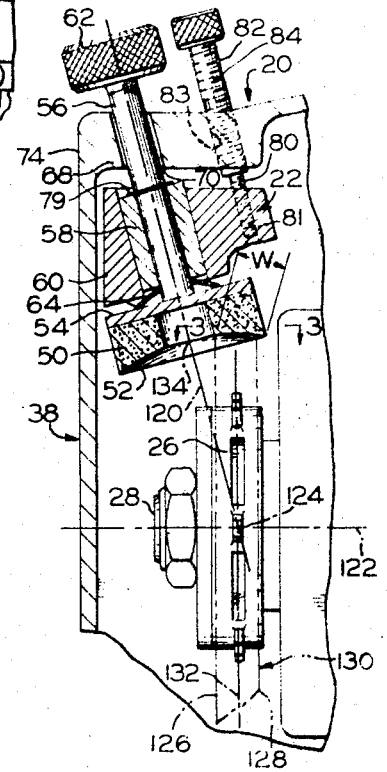
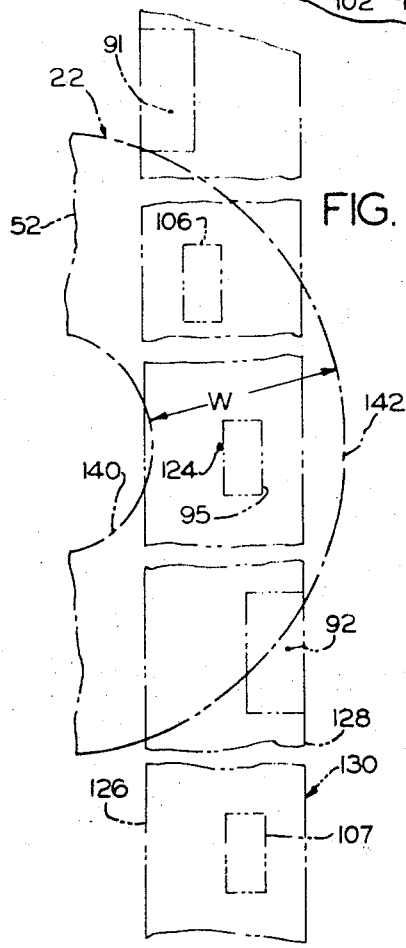
MYRON D. TUPPER
*INVENTOR*
BY
BUCKHORN, BLORE, KLARQUIST & SPARKMAN
*ATTORNEYS*

United States Patent Office 3,465,795
Patented Sept. 9, 1969

3,465,795
EASILY DRESSED SHARPENER
Myron D. Tupper, Portland, Oreg., assignor to Omark Industries, Inc., Portland, Oreg., a corporation of Oregon
Filed Nov. 9, 1966, Ser. No. 593,019
Int. Cl. B27b *17/00;* B23d *63/00*
U.S. Cl. 143—32    12 Claims

ABSTRACT OF THE DISCLOSURE

An annular, cupped, abrasive member is mounted for rotation on an axis intersecting the drive sprocket of a chain saw at the axis of rotation of the sprocket. The abrasive member is rotated by contact with the saw chain to dress itself, and is spring urged toward the saw chain.

---

This invention relates to an easily dressed sharpener for a chain saw, and more particularly to a sharpener for a chain saw which has a sharpening member which is dressed by rotation thereof.

Sharpeners for chain saws which are either mounted on the saw bars for sharpening at the nose end of the saw bars or mounted adjacent the drive sprocket for sharpening at the drive sprocket have been known hitherto. One type of such sharpeners includes an elongated, arcuate, wearable abrasive sharpening member or stone which is mounted for bodily movement laterally relative to the chain to dress the stones and for bodily movement radially of the chain to effect sharpening feed. In such a type of sharpener, the mechanism for effecting sharpening and dressing movements is necessarily rather complex and expensive. It would be desirable to provide a simpler and less expensive sharpener.

An object of the invention is to provide an easily dressed sharpener for a chain saw.

Another object of the invention is to provide a sharpener for a chain saw which has a sharpening member which is dressed by rotation thereof.

A further object of the invention is to provide a sharpener for a chain saw in which a cupped, annular, wearable sharpening stone is moved angularly toward a portion of a saw chain being advanced along an arcuate portion of its path and also is rotated on its axis as it engages the saw chain to dress the stone.

Another object of the invention is to provide a sharpener for a chain saw having a cupped, annular stone carried by a shaft rotatable on an axis intersecting the center of an arcuate portion of the path of the saw chain and also movable along the axis to move the stone into engagement with the saw chain.

A further object of the invention is to provide an easily dressed sharpener which can be easily installed on existing chain saws.

Another object of the invention is to provide a sharpener having a resilient feed of a sharpening element thereof.

The invention provides a sharpener for a chain saw preferably having a spring against a saw chain during sharpening. The sharpener preferably has a cupped, annular sharpening stone mounted for rotation on its longitudinal axis and movement along said axis angularly toward the center of an arcuate portion of the path of a saw chain for sharpening the chain and dressing the stone. A sharpener forming one embodiment of the invention includes an annular sharpening stone having a spherical sharpening surface and mounted on a shaft mounted for rotation in a bearing carried adjustably by a detachable sprocket cover of the chain saw, the shaft extending angularly relative to the center of the sprocket and angularly relative to the plane of the saw chain, the cover mounting thereon an adjustment screw which controls the sharpening feed movement to control the sharpening cut, the radial width of, and the position of the annular stone being such that the outer periphery of the stone extends at least to the far edge of the path of the saw chain and the inner periphery of the stone extends at least to but not outside the path of the chain.

A complete understanding of the invention may be obtained from the following detailed description of an easily dressed sharpener for a chain saw forming a specific embodiment thereof, when read in conjunction with the appended drawings, in which:

FIG. 1 is a side elevation view of a chain saw and a sharpener forming one embodiment of the invention;

FIG. 2 is a sectional view of the chain saw and sharpener of FIG. 1 taken substantially along line 2—2 of FIG. 1; and FIG. 3 is an enlarged schematic view taken substantially along line 3—3 of FIG. 2.

Referring now in detail to the drawings, there is shown therein a chain saw 20 including a sharpener 22 forming a specific embodiment of the invention. The chain saw has a drive sprocket 26 driven by an engine output shaft 28 to advance a saw chain 30 therearound and along a saw bar 32 having an arcuate nose portion (not shown) of greater diameter than that of the drive sprocket. The sharpener is a cover-mounted, unitary assembly, and includes a cover 38 fastened to a main casting or frame 24 of the chain saw by studs 36 and nuts 37 which also fasten the saw bar to the frame.

An annular, wearable sharpening member or stone 50 having an annular, substantially spherical sharpening surface 52 is cemented to and carried by a disc 54 rigidly fixed to the end of an actuating shaft 56, which is slidable and rotatable in a bearing sleeve 58 fixed in a bearing mounting block or carrier 60 mounted movably on the cover. The shaft 56 has a knurled knob 62 and is urged downwardly toward a retracted position by a cupped spring washer 64 bearing between the disc 54 and the sleeve 58. A top wall 68 of the cover has a clearance hole 70 for the shaft 56. A pair of dowels 72 parallel to the actuating shaft 56 and fixed to the cover mount the mounting block slidably for movement relative to the cover which has a thickened corner portion 74. A split ring 79 in a groove in the shaft 56 limits downward movement of the shaft 56 relative to the sleeve 58 while permitting rotation of the shaft 56 in the sleeve 58.

The mounting block 60 (FIGS. 1 and 2) has a tapped bore 80 extending parallel to the sleeve 58 and into which a threaded portion 81 of an adjusting screw 82 is threaded. A threaded portion 84 of the screw 82 is screwed into a tapped bore 83 in a boss portion of the top wall 68 of the cover 38. The lower threaded portion 81 and the tapped bore 80 have the same predetermined pitch, and the upper threaded portion 84 and the tapped bore 83 are the same as each other in pitch but are somewhat different in pitch from the threaded portion 81 and the tapped bore 80. The directions of the threads of all these elements are the same. Hence, as the screw 82 is turned, the block 60 is moved toward or away from the sprocket according to the difference in pitch of the portions 81 and 84. This provides a fine adjustment while enabling the threads to be coarse to provide strength. The adjustment screw is adapted to move the shaft 56 and the sharpening member 50 toward the saw chain 30 to sharpen the saw chain.

The saw chain 30 (FIG. 1) has side slitter teeth 91 and 92 and raker teeth 93, 94 and 95. The slitter teeth are mounted on allochiral side links 96 and 97, the raker teeth 93 and 94 are mounted on allochiral center drive links 98 and 99, and the raker teeth 95 are mounted on center drive links 100. Forward, cutting edges 102 of outer tips 104 of the teeth 91 to 95 are each positioned rearwardly of the midpoint of an imaginary line joining the pivot axes of the link of which that tooth forms a part. The cutting edges of the raker teeth 93 to 95 are positioned farther back of the midpoints of the respective lines joining the pivot axes of the links 98 to 100 than are the cutting edges 102 of the slitter teeth 91 and 92 to the rear of the midpoints of the lines joining the pivot axes of the links 96 and 97. Depth gauges 106 and 107 are provided on the links 96 and 97 in positions in which rear edges 108 of tips 109 of the depth gauges are each positioned farther forwardly of the midpoint of the line joining the pivot axes of the link 96 or 97 than is the cutting edge 102 of that link positioned to the rear of the midpoint of the line. Side links 110, center drive links 112 and rivets 114 complete the saw chain 30.

Centerline 120 (FIG. 2) of the actuating shaft 56 and the sharpening member 50 intersects centerline 122 of the drive shaft 28 at a point 124 which is midway between side edges 126 and 128 of a path 130 (FIG. 3) defined by the tips 104 and 109 of the teeth and depth gauges of the saw chain 30. The centerline 120 forms an angle $\alpha$ with a center plane 132 of the sprocket and the chain, and center 134 of the sharpening surface 52 is offset from the plane 132 by the distance $h$. The mathematical relationship that the distance that the sharpening member should be offset from the center plane of the chain and the angle $\alpha$ that the sharpening member should make with the plane of the chain is $h = R \sin \alpha$ where $R$ is the radius of the portion of the path 130 extending around the sprocket 26. It should be pointed out that this relationship is not too critical for small values of $\alpha$ and need not be held exact. The size of the sharpening surface of the sharpening member is sufficiently large that the sharpening surface always spans at least two adjacent teeth 91 to 95.

Radial width $w$ of the sharpening surface 52 (FIGS. 2 and 3), which is the distance from inner periphery 140 of the surface 52 to outer periphery 142 thereof, is greater than the width of the path 130. The radius of the inner periphery 140 and the offset distance $h$ are such that the inner periphery 140 extends at least to the edge 126 of the path 130 and preferably extends a small distance beyond the edge 126 and into the path 130. This insures dressing of the surface 52 across the entire radial width of the surface 52. The width $w$ is such that the outer periphery 142 extends beyond the edge 128 of the path 130 to insure sharpening across the entire width of the saw chain.

To sharpen the saw chain, the engine of the chain saw 20 is started, the adjustment screw 82 being in a backed-off position so that the block 60 holds the sharpening member 50 in a retracted position. The user then turns the adjustment screw to move the block 60 toward the sprocket, and the spring 64 urges the sharpening member softly or resiliently into engagement with the saw chain 30 to sharpen the saw chain. During the sharpening, the user grips the knob 62 and permits it to be rotated slowly by the sharpening member 50, which is in engagement with the moving saw chain and is rotated thereby. The dressing keeps the surface 52 substantially spherical since the surface is dressed along the arcuate portion of the path 130 of the tips of the projecting elements of the saw chain entered on the point 124 and the surface 52 also is centered on the point 124.

The above-described sharpener 22 gently, smoothly and accurately sharpens the saw chain 30, and the stone 50 is simply and easily dressed merely by controlling its rotation during the sharpening. The entire mechanism of the sharpener is very simple while being accurate and rugged. While the sharpener has been disclosed as mounted for sharpening the portion of the chain traveling around the drive sprocket, it obviously can be mounted on the arcuate nose of the saw bar with the axis 120 of the stone angularly intersecting the center of the nose of the saw bar. The sharpener 22 can be installed on an existing or used chain saw merely by substituting the cover 38 with the sharpener thereon for the existing cover of the chain saw.

What is claimed is:
1. In a combination including a chain saw provided with
   a saw chain having top sharpenable teeth,
   frame means including means for guiding said saw chain along a predetermined path in a predetermined plane and including an arcuate portion centered on a predetermined point in said plane,
   and means for advancing said saw chain along said path,
   a sharpener comprising
   a sharpening member having a cupped sharpening surface on one end thereof,
   and mounting means mounting the sharpening member on said frame means for rotational movement on and sliding movement along a predetermined axis inclined relative to said plane of said saw chain and angularly intersecting a line normal to said plane and extending through said point.
2. The combination of claim 1 wherein
   said sharpening surface of said sharpening member is annular in shape and is centered on said axis,
   the inner periphery of said sharpening surface extending at least to an edge of but not appreciably into the path of the tips of said teeth of said saw chain as said tips are advanced along said arcuate portion of said predetermined path of said saw chain,
   the outer periphery of said sharpening surface extending at least to the other edge of said path of said tips,
   said sharpening surface being concave.
3. The combination of claim 1 wherein said axis intersects said point.
4. The combination of claim 2 wherein said axis intersects said point.
5. The combination of claim 2 wherein
   said mounting means includes bearing means carried by said frame means and extending along said axis,
   an actuating shaft rotatable in said bearing means and carrying said sharpening member on one end thereof,
   and actuating means adapted to move said shaft axially to move said sharpening surface into engagement with said tips of said teeth of said saw chain and for effecting rotation of said sharpening surface to move the portion thereof engaging said saw chain at a substantially different rate of speed than that at which said chain tends to rotate said sharpening surface.
6. The combination of claim 5 wherein said actuating means includes a knob at the end of said shaft opposite to that at which said sharpening member is mounted.
7. The combination of claim 5 wherein said shaft includes at one end thereof a disc mounting said sharpening member on one face thereof,
   and said actuating means includes an internally threaded member and an adjustment screw extending into said internally threaded member for moving said sharpening surface toward said chain.
8. The combination of claim 5 wherein said frame means includes a mounting portion and a cover detachably secured to said mounting portion,
   said mounting means being mounted on said cover.
9. The combination of claim 8 wherein said cover includes a reinforced corner portion,
   and mounting means being mounted on said corner portion of said cover.
10. A sharpening member for top sharpening a saw chain as said chain is advanced around an arcuate portion of a path lying substantially in a predetermined plane and comprising an annular abrasive stone having at one end thereof a substantially spherical sharpening surface, said stone being adapted to be mounted for rotation on and for movement along an axis extending along a line forming an acute angle with said plane and intersecting the center of said arcuate portion at a point in said plane, said stone having a predetermined radial width in which, when said stone is mounted on said axis, the inner periphery of said stone extends at least to one edge of said path and the outer periphery of said stone extends at least to the other edge of said path.

11. In combination, a chain saw frame, a drive shaft carried rotatably by said frame, a drive sprocket driven by said shaft on a saw bar mounted on said frame, a saw chain having top sharpenable projecting elements and mounted in a predetermined plane on said sprocket and said saw bar, a cover having a thickened corner portion and a clearance hole in said corner portion, means detachably mounting said cover and said saw bar on said frame, guide means fixed to said corner portion and extending toward the center of said sprocket, a bearing block slidable on said guide means and having a first bore aligned with said clearance hole and extending parallel to said guide means and along an axis extending angularly toward and intersecting the axis of said drive shaft at a point in said plane, said bearing block also including a tapped bore offset laterally from and parallel to said first bore, a sleeve bearing in said first bore, a feed screw carried by said cover and extending through said tapped bore, an actuating shaft held against thrust relative to and rotatable in said sleeve bearing and having a knob at the outer end thereof and a mounting disc at the inner end thereof, a compression spring seated between said disc and said block to urge said actuating shaft toward said sprocket, and an annular sharpening stone secured to said mounting disc and having an annular, spherically concave sharpening surface having such a width and being so positioned relative to a portion of said saw chain being advanced around said sprocket that the inner periphery of said sharpening surface extends at least to the most adjacent edge of the path of the tips of said projecting elements and not appreciably therebeyond and the outer periphery of said sharpening surface extends at least to the other edge of said path.

12. The combination of claim 1 wherein said mounting means includes a block and spring means urging said sharpening member toward said saw chain.

References Cited

UNITED STATES PATENTS

| 934,850 | 9/1909 | Steele | 269—241 |
|---|---|---|---|
| 2,643,553 | 6/1953 | Evanoff | 76—37 |
| 3,260,287 | 7/1966 | Oehrli. | |

FOREIGN PATENTS

| 20,197 | 9/1910 | Great Britain. |
|---|---|---|
| 290,384 | 2/1916 | Germany. |

DONALD R. SCHRAN, Primary Examiner

U.S. Cl. X.R.

76—25